United States Patent [19]

Murata

[11] Patent Number: 4,682,676
[45] Date of Patent: Jul. 28, 1987

[54] ELECTROMAGNETIC POWDER CLUTCH WITH TWO POWDER GAPS

[75] Inventor: Kiyohito Murata, Susono, Japan

[73] Assignee: Toyota Jidosha Kabushiki Kaisha, Aichi, Japan

[21] Appl. No.: 787,757

[22] Filed: Oct. 15, 1985

[30] Foreign Application Priority Data

Oct. 26, 1984 [JP] Japan .............................. 59-226174
Jan. 10, 1985 [JP] Japan .............................. 60-2037[U]
Jan. 10, 1985 [JP] Japan .............................. 60-2038[U]

[51] Int. Cl.⁴ ...................... F16D 37/02; F16D 27/02
[52] U.S. Cl. ................................ 192/21.5; 192/84 E
[58] Field of Search ........................... 192/21.5, 84 E

[56] References Cited

U.S. PATENT DOCUMENTS

| 2,614,668 | 10/1952 | Waderlow et al. | 192/21.5 |
| 2,745,527 | 5/1956 | Winther | 192/21.5 |
| 2,851,136 | 9/1958 | Sussebach et al. | 192/21.5 |
| 2,903,109 | 9/1959 | Didszuns | 192/21.5 |

FOREIGN PATENT DOCUMENTS

| 1136150 | 5/1957 | France | 192/21.5 |
| 519398 | 3/1955 | Italy | 192/21.5 |
| 709593 | 5/1954 | United Kingdom | 192/21.5 |
| 769868 | 3/1957 | United Kingdom | 192/21.5 |

Primary Examiner—Rodney H. Bonck
Attorney, Agent, or Firm—Parkhurst & Oliff

[57] ABSTRACT

An electromagnetic powder clutch of double-gap type comprising a first rotary member, a second rotary member and a labyrinth device. The first rotary member has a first friction surface, and a second friction surface which is disposed radially inwardly of and opposite to the first friction surface. The second rotary member of an annular shape incorporates therein an annular solenoid coil and has a wall thickness sufficient to accommodate the solenoid coil. The second rotary member is disposed between the first and second friction surfaces of the first rotary member, and has a radially outer friction surface opposite to the first friction surface and a radially inner friction surface opposite to the second friction surface. The outer friction surface of the second rotary member cooperates with the first friction surface to define therebetween a first powder gap accommodating a first mass of magnetic powder, while the inner friction surface cooperates with the second friction surface to define therebetween a second powder gap accommodating therein a second mass of magnetic powder. The labyrinth device closes the first and second powder gaps to enclose the first and second masses of magnetic powder in the first and second powder gaps, respectively.

5 Claims, 9 Drawing Figures

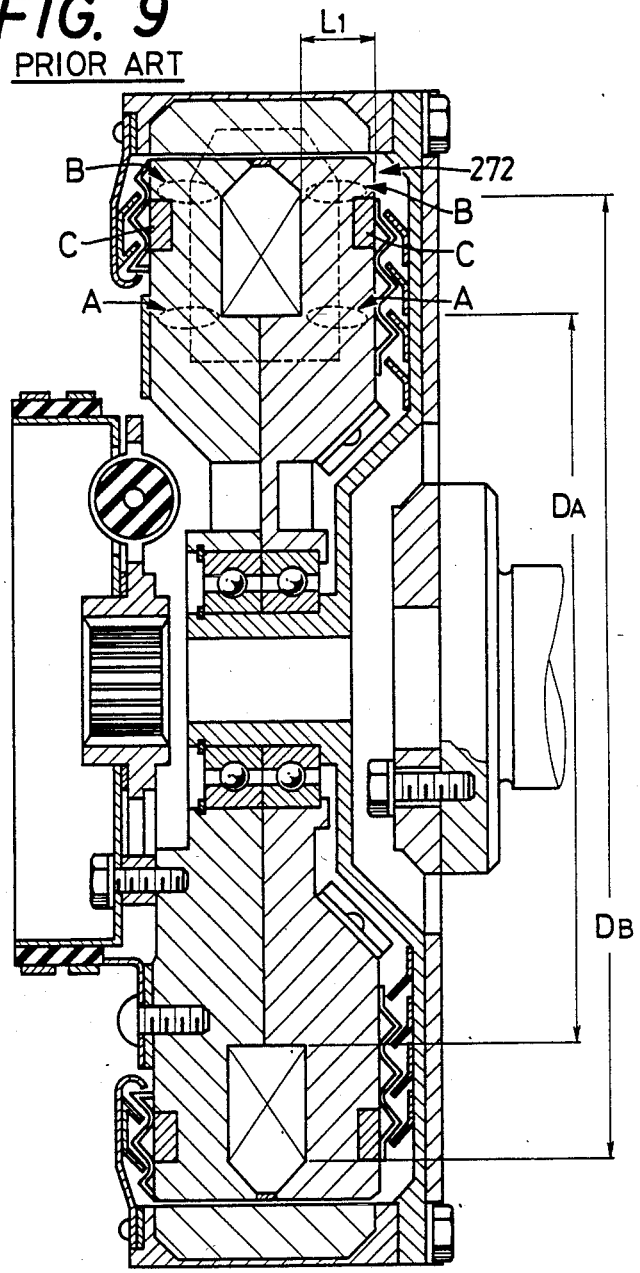

ELECTROMAGNETIC POWDER CLUTCH WITH TWO POWDER GAPS

BACKGROUND OF THE INVENTION

1. Field of the Art

The present invention relates generally to an electromagnetic powder clutch, and more particularly to improvements in an electromagnetic powder clutch having two powder gaps accommodating masses of magnetic powder.

2. Related Art Statement

As a clutch for automotive vehicles and other applications, an electromagnetic powder clutch is known.

Such an electromagnetic powder clutch is classified into a single-gap type and a plural-gap type. The single-gap type has a single powder gap in which a mass of magnetic powder is accommodated. The plural-gap type has a plurality of powder gaps, generally two powder gaps.

While an electromagnetic powder clutch of the single-gap type is advantageous for its simple construction and comparatively high operating stability, its torque transmission capacity is smaller than the plural-gap type. Consequently, the powder clutch of the single-gap type must be comparatively large-sized to provide the same torque transmission capacity as the powder clutch of the plural-gap type. This is a disadvantage of the single-gap type.

On the other hand, an electromagnetic clutch of the plural-gap type has a relatively large capacity with a relatively small size. For this reason, the plural-gap type is used when space for installation is limited.

An electromagnetic powder clutch of the plural-gap type is either of a non-separate gap type or of a separate gap type. In a powder clutch having two powder gaps, for example, the two powder gaps are continuous or separate. More specifically, the non-separate gap type has a mass of magnetic powder which may be moved from one powder gap to another, while the separate gap type has two masses of magnetic powder which are accommodated in two mutually independent powder gaps. In the separate gap type, the powder masses are not permitted to meet each other.

However, the non-separate or continuous gap type is unstable in torque transmission capability, because the powder mass may be moved between the two powder gaps. This is a problem with a powder clutch of the non-separate gap type.

When the installation space is limited and high torque transmission capability is desired, it has been a practice to use an electromagnetic powder cluch of the plural separate gap type. This type of powder clutch is satisfactory in its torque transmission stability, because each of the powder masses is inhibited from moving from one powder gap to another, i.e., the powder mass is enclosed in the corresponding independent powder gap, like the powder mass in a single powder gap.

However, a conventional powder clutch of two separate gap type tends to have a larger dimension in the axial direction of the clutch than the clutch of the plural non-separate gap type. Described in more detail, a commonly used powder clutch of the two separate gap type has two annular powder gaps on both inner and outer sides of an annular member. The two powder gaps are spaced from each other in the radial direction of the clutch. These two annular powder gaps are closed at their opposite axial ends by four respective labyrinth units to prevent the powder masses from being discharged from the corresponding powder gaps. The four labyrinth units are disposed at each end of the two powder gaps, in spaced-apart relation in the axial direction of the clutch. On the other hand, a powder clutch of two non-separate or continuous gap type uses only two labyrinth units, at one axial end of each powder gap, which two labyrinth units are spaced from each other in the axial direction. Accordingly, the axial lenth of the two separate gap type is larger than the two non-separate gap type, by a distance corresponding to the two spaced-apart labyrith units used at each end of the two powder gaps.

In view of the above, there has been a need of minimizing the overall axial length of a powder clutch for the plural separate gap type by means of reducing the length necessary for provision of a labyrinth device to enclose powder masses in respective powder gaps.

In a powder clutch of two gap type having a radially outer annular gap and a radially inner annular gap, it is needless to say that the diameter of the outer annular gap is larger than that of the inner annular gap. Hence, the area of an outer friction surface of the radially outer annular gap is larger than that of the radially inner annular gap if the two annular gaps have the same axial length. Consequently, a maximum transmission torque is obtained when a maximum magnetic flux density is reached on the outer friction surface of the radially inner annular gap. Namely, the maximum transmission torque of the clutch is determined by the area of the outer friction surface of the inner annular gap. Further, since the area of the outer friction surface of the inner annular gap is smaller than that of the outer annular gap, the magnetic flux density is higher on the friction surface of the inner annular gap than on the friction surface of the outer annular gap. Therefore, the transmission torque and the amount of heat generated per unit area are larger on the friction surface of the inner annular gap than on the friction surface of the outer annular gap. This fact, combined with relatively poor heat dissipation from the radially inner portion of the clutch, will lead to reduced durability of the electromagnetic power clutch.

SUMMARY OF THE INVENTION

It is accordingly a primary object of the present invention to provide an electromagnetic powder clutch which has two powder gaps separated from each other by a labyrinth device, and which has a minimum axial dimension required for installation of the labyrinth device.

It is a second object of the invention to provide an electromagnetic powder clutch of such two separate gap type, wherein the ouer friction surfaces of the radially outer and inner annular gaps have a difference in area as small as possible, to improve the torque transmission capability and durability of the clutch.

A third object of the present invention is the provision of an electromagnetic powder clutch of such two separate gap type having an annular yoke member which supports a solenoid coil and which cooperates with other members to define two annular powder gaps, wherein the radially outer portion of the yoke member does not have an excessive mass which will increase the weight and inertia of the yoke member and power loss, and which will lower response of the clutch.

According to the present invention, there is provided an electromagnetic powder clutch of double-gap type, comprising: (a) an annular driven rotary member incorporating therein a solenoid coil and having a portion which is made of a magnetic material and which surrounds the solenoid coil; (b) a connecting member made of a non-magnetic material; (c) a first and a second driving rotary member disposed radially outwardly and inwardly of the annular driven rotary member, respectively, and connected to each other by the connecting member, the first driving rotary member and the driven rotary member cooperating to define a first powder gap therebetween, and the second driving rotary member and the driven rotary member cooperating to define a second powder gap therebetween, the first and second powder gaps accommodating therein a first and a second mass of magnetic powder, respectively, the first and second driving rotary members including a radially inner and a radially outer portion made of a magnetic material, respectively, the radially inner and outer portions of the first and second driving rotary members being opposite to an outer and an inner surface of the driven rotary member, respectively; and (d) a labyrinth device disposed to separate the first and second annular powder gaps from each other.

According to the invention, there is also provided an electromagnetic powder clutch of double-gap type, comprising a first rotary member, a second rotary member and a labyrinth device. The first rotary member has a first friction surface and a second friction surface which is disposed radialy inwardly of and opposite to the first friction surface. The second rotary member of an annular shape incorporates therein an annular solenoid coil and has a wall thickness sufficient to accommodate the solenoid coil. The second rotary member is disposed between the first and second friction surfaces of the first rotary member, and has a radially outer friction surface opposite to the first friction surface and a radially inner friction surface opposite to the second friction surface. The outer friction surface of the second rotary member cooperates with the first friction surface to define therebetween a first powder gap accommodating a first mass of magnetic powder, while the inner friction surface cooperates with the second friction surface to define therebetween a second powder gap accommodating therein a second mass of magnetic powder. The labyrinth device closes the first and second powder gaps to enclose the first and second masses of magnetic powder in the first and second powder gaps, respectively.

In the electromagnetic powder clutch constructed according to the invention as described above, the second or driven rotary member of annular shape has a relatively large radial wall thickness sufficient to accommodate therein the solenoid coil. Accordingly, the first and second powder gaps formed on the radially outward and inward sides of the second or driven rotary member are radially spaced apart by a considerably large distance corresponding to the radial wall thickness of the second or driven rotary member. Therefore, labyrinth members of the labyrinth device for the first and second powder gaps may be disposed at substantially the same position in the axial direction of the clutch, at each axial end of the powder gaps. More specifically, it is not necessary that the labyrinth member or members for one axial end of the first powder gap be spaced a considerable distance in the axial direction from the labyrinth member or members for the corresponding end of the second powder gap, as required in a conventional powder clutch of two separate gap type. Hence, the overall axial length of the instant powder clutch is significantly reduced.

The second object of the invention may be attained according to an advantageous embodiment of the present invention wherein the radially outer friction surface of the second rotary member has an area which is 70–130% of an area of the second friction surface of the first rotary member.

In the above embodiment, a magnetic flux density on the radially outer friction surface of the second rotary member is held within a range of 70–130% of that on the second friction surface of the first rotary member. In other words, a difference in magnetic flux density between the first and second powder gaps disposed in a common magnetic circuit formed by the common solenoid coil is held within 30%.

In accordance with a preferred form of the invention, the radially outer friction surface of the second rotary member and the second friction surface of the first rotary member have substantially the same area. In this case, the outer friction surface of the second rotary member and the second friction surface of the first rotary member are subject to magnetic forces of substantially the same flux density. Therefore, it is possible to prevent one of the first and second powder gaps from being magnetically saturated when the other powder gap is in a considerably unsaturated condition. Thus, the torque transmission capability of the clutch is improved. Further, the instant arrangement results in an increase in the magnetic flux density on the outer friction surface of the second rotary member, as compared with a conventional arrangement wherein the outer friction surface of the second rotary member has a greater area than the second friction surface of the first rotary member. As a result, the torque transmitted by the first powder mass in the first or outer powder gap is increased. Since the amount of heat generated at each powder gap is a product of the transmission torque and the number of revolutions due to slip between the first and second rotary members, the amount of heat generated at the outer or first powder gap is increased. This is favorable because the amount of heat dissipated is greater at the outer powder gap than at the inner or second powder gap. Hence, the durability of the clutch is improved.

The third object of the invention may be accomplished according to another advantageous embodiment of the invention wherein the second rotary member comprises two portions which surround the solenoid coil in cross section taken in a plane including an axis of the second rotary member, a wall thickness of the two halves as measured along the axis of the clutch being reduced as the two halves extend in a radially outward direction in the cross sectional plane.

In the above embodiment, unnecessary weight of the second rotary member at its radially outer portion is eliminated, and the overall weight and moment of inertia of the second rotary member are minimized, whereby operating response of the clutch is enhanced. Further, when the present powder clutch is used for a car, the fuel economy of the car is improved.

BRIEF DESCRIPTION OF THE DRAWING

The above and other objects, features and advantages of the present invention will be better understood from the following detailed description of preferred embodiments of the invention, when considered in connection with the accompanying drawings, in which:

FIG. 9 is a view corresponding to FIG. 3, showing an electromagnetic powder clutch of a single-gap type.

DETAILED DESCRIPTION OF THE PREFERRED EMBODIMENTS

To further clarify the concept of the present invention, several preferred embodiments of the invention will be described in detail, by reference to the accompanying drawings.

Figure 1:
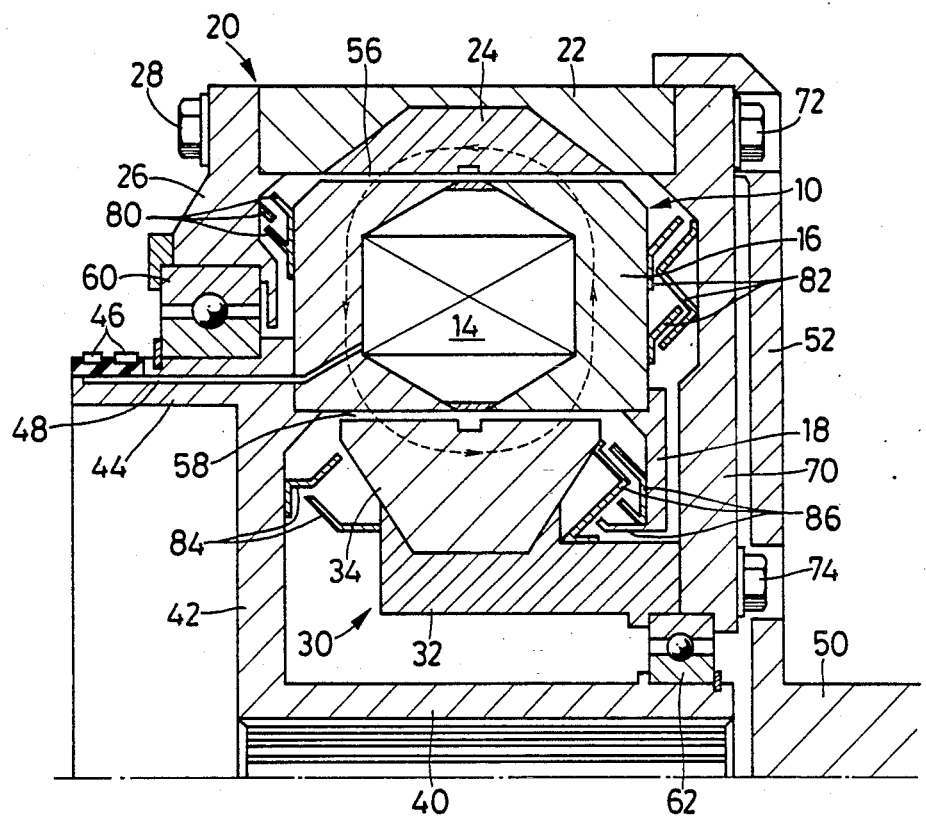
FIG. 1 is an elevational view in cross section of one embodiment of an electromagnetic powder clutch of the present invention.

Referring first to FIG. 1, there is illustrated a first embodiment of an electromagnetic powder clutch of the invention.

In the figure, reference numeral 10 designates a driven or second rotary member in the form of a yoke, while reference numberals 20 and 30 designate a first and a second driving member, respectively. The first and second driving members 20, 30 are connected by a connecting member 70, into a unitary member which functions as a first rotary member. The yoke 10 incorporates therein a solenoid coil 14. Portions surrounding the solenoid coil 14 cooperate to form a magnetic-field portion 16 which is made of a magnetic material. The yoke 10 is connected to an output member in the form of an output shaft 40, by a flange 42 formed as an integral part of the output shaft 40. The flange 42 is formed at a left-hand side end of the output shaft 40, as viewed in FIG. 1, and has a support portion 44 at a radially outer portion thereof. The support portion 44 carries slip rings 46, 46 which are provided to apply power to the solenoid coil 14 through lead wires 48.

The first driving member 20 is disposed radially outwardly of the yoke 10, with a predetermined radial clearance or gap therebetween. The first driving member 20 comprises a support portion 22, an intermediate portion 24 supported by the support portion 22 and located opposite to the yoke 10, and a covering member 26 attached to the support portion 22. The intermediate portion 24 is spaced a suitable distance from a radially outer surface of the yoke 10, and is made of a suitable magnetic material such as iron. In the meantime, the support portion 22 is made of a non-magnetic material such as aluminum, and formed by diecasting. The covering member 26 is fixed, with bolts 28, to a left-hand side end of the support portion 22, as seen in FIG. 1.

The second driving member 30 is disposed radially inwardly of the yoke 10 with a suitable radial clearance or gap therebetween. The second driving member 30 comprises a support portion 32, and a portion 34 which is supported by the support portion 32 and located opposite to the yoke 10. The portion 34 is spaced a suitable distance from a radially inner surface of the yoke 10. The portion 34 and the support portion 32 of the second driving member 30 are made of the same materials as the intermediate portion 24 and the support portion 22 of the first driving member 20. Namely, the portion 34 is made of a magnetic material, while the support portion 32 is made of a non-magnetic material.

The previously indicated connecting member 70 which connects the first and second driving members 20, 30 is made of a non-magnetic material, and is attached to right-hand side ends of the driving members 20, 30, as viewed in FIG. 1, with bolts 72 and 74, respectively. Thus, the first and second driving members 20, 30, and the connecting member 70 constitute a unitary member serving as the first rotary member previously indicated. This driving rotary member is connected to an input member in the form of an input shaft 50, by a flange 52 formed as an integral part of the input shaft 50. The driving rotary member is rotatably supported and positioned relative to the output shaft 40 by means of left and right bearings 60, 62 (in FIG. 1). More specifically, the left bearing 60 rotatably supports the covering member 26 of the first driving member 20 relative to the output shaft 40, while the right bearing 62 rotatably supports the support portion 32 of the second driving member 30 and the connecting member 70 relative to the output shaft 40.

The opposite surfaces of the intermediate portion 24 of the first driving member 20 and the yoke 10 cooperate to define a first or radially outer annular powder gap 56. In the meantime, the opposite surfaces of the portion 34 of the second driving member 30 and the yoke 10 cooperate to define a second or radially inner annular powder gap 58. These annular powder gaps 56, 58, which are formed on the radially outer and inner sides of the yoke 10, accommodate corresponding masses of magnetic powder (now shown). Thus, the electromagnetic powder clutch of FIG. 1 is of plural gap type.

The powder clutch is provided with labyrinth members 80, 82, 84 and 86 to prevent the powder masses from being discharged out of the respective powder gaps 56, 58. The labyrinth members 80 and 82 are provided for the first powder gap 56, while the labyrinth members 84 and 86 are provided for the second powder gap 58. The labyrinth members 80 or the first powder gap 56 are attached to and disposed between the left end face of the yoke 10 and the opposite surface of the covering member 26 of the first driving member 20, so that the labyrinth members 80 cooperate to prevent the powder mass in the first powder gap 56 from being discharged through the left open end of the gap 56. The labyrinth members 82 are attached to and disposed between the right end face of the yoke 10 and the opposite surface of the connecting member 70, so that the labyrinth members 82 cooperate to prevent the powder mass in the first powder gap 56 from being discharged from the right open end of the gap 56. The labyrinth members 84 for the second powder gap 58 are attached to and disposed between the left end face of the second driving member 30 and the opposite surface of the flange 42 of the output shaft 40, so that the labyrinth members 84 cooperate to prevent the powder mass in the second powder gap 58 from being discharged through the left open end of the gap 58. The labyrinth members 86 for the second powder gap 58 are attached to an disposed between the right end face of the second driving member 30 and the opposite surface of a mounting member 80 attached to the yoke 10, so that the labyrinth members 86 cooperate to prevent the powder mass in the second powder gap 58 from being discharged through the right open end of the gap 58. These labyrinth members 80, 82, 84 and 86 are all made of a non-magnetic material, and are dimensioned, shaped and positioned, as shown in FIG. 1, so as to form suitable labyrinth means required to block the powder masses.

Since the first and second powder gaps 56 and 58 are spaced from each other in the radial direction of the annular yoke 10, by a considerably large distance corresponding to a wall thickness of the yoke 10 which incorporates the solenoid coil 14, it is not necessary that a set of the labyrinth members 80 and a set of the labyrinth members 82 for the first powder gap 56 be spaced from corresponding sets of the labyrinth members 84 and 86 for the second powder gap 58 in the axial direction of the annular yoke 10, as required in a conventional powder clutch of two gap type wherein two sets of labyrinth members at each axial end of a yoke are disposed in axially spaced-apart relation. In the present embodiment, therefore, the axial distance between the labyrinth members 80,82 may be minimized.

The operation of the electromagnetic powder clutch which has been described hitherto will be described.

The powder clutch is engaged when the solenoid coil 14 is energized upon application of power through the slip rings 46 and lead wires 48. Upon energization of the solenoid coil 14, a magnetic flux as indicated in broken line in FIG. 1 is produced. More particularly, the magnetic flux is formed so as to pass the intermediate portion 24 of the first driving member 20, the magnetic-field portion 16 of the yoke 10, and the portion 34 of the second driving member 30. The direction of the magnetic flux is reversed if the direction of winding of the coil 14 is reversed.

With the magnetic flux produced as described above, particles of the powder masses in the first and second powder gaps 56, 58 cohere into tight coherent bodies in the respective powder gaps, thereby connecting the driving rotary members (first rotary member) 20, 30, and the driven rotary member (second rotary member) 10 by means of a frictional force between the particles and a magnetic bonding force, whereby a rotary motion of the input shaft 50 is transmitted to the output shaft 40.

The electromagnetic powder clutch is disengaged upon deenergization of the solenoid coil 14 and consequent removal of the magnetic flux, which cause the coherent bodies of the magnetic powder to be demagnetized into normal loose aggregates, with a result of disconnecting the input shaft 50 from the output shaft 40.

As described hitherto, the instant powder clutch having the two powder gaps (first and second powder gaps) 56, 58 has a torque transmission capability about 1.5–2.0 times as large as a conventional powder clutch of single-gap type of the same outside diameter.

Since the first powder gap 56 and the second powder gap 58 are separated by the labyrinth members 80, 82, 84 and 86 into two independent spaces, the powder masses accommodated therein are similarly separated from each other, and are not allowed to move from one powder gap into another beyond the labyrinth members. Therefore, the torque transmission performance of the clutch is as stable as in a powder clutch of single-gap type. Stated another way, the instant electromagnetic powder clutch may be considered to be a combination clutch which consists of a first inner powder clutch having the annular powder gap 58 and the external solenoid coil 14, and a second outer powder clutch having the annular powder gap 56 and the internal solenoid coil 14, such that the single common solenoid coil 14 is used for the inner and outer powder clutches. Accordingly, the torque transmission stability of the present embodiment of the powder clutch is comparable to that of a powder clutch having a single powder gap.

Figure 2:
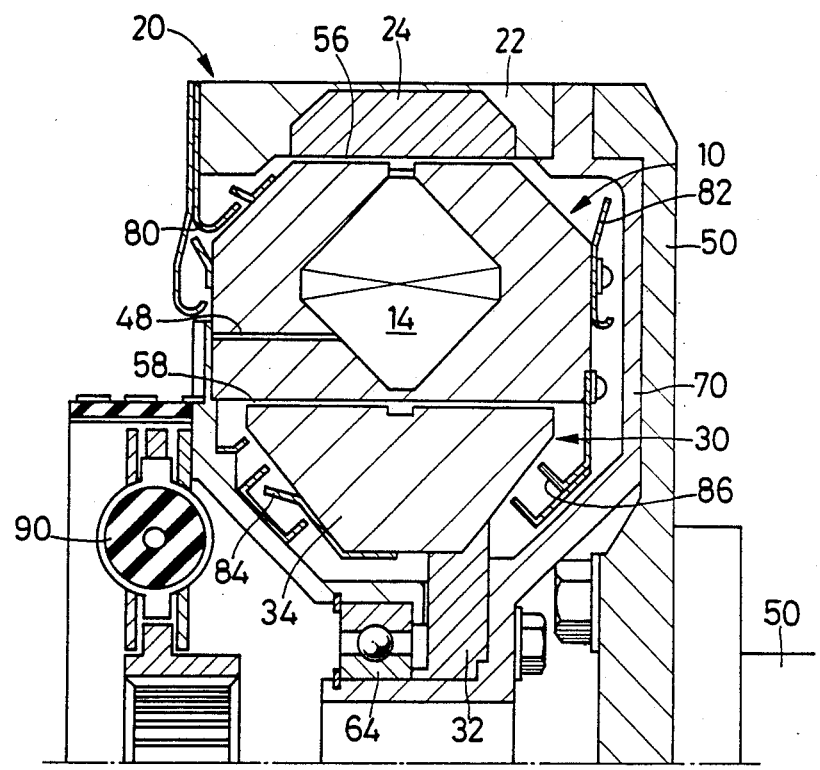
FIG. 2 is a view corresponding to FIG. 1, showing another embodiment of the invention.

Referring next to FIG. 2, there is illustrated a second embodiment of an electromagnetic powder clutch of the invention.

While the first embodiment uses the two bearings 60, 62, the second embodiment uses a single bearing 64 which is disposed inside the second driving member 30, so that the axial length of the clutch is further shortened. The bearing 64 is positioned substantially in alignment with the center of gravity of the first or driving rotary member (first and second driving members 20, 30) and the second or driven rotary member (yoke 10). In this second embodiment, the yoke 10 is connected to the output shaft via a rubber damper 90.

In other aspects, the second embodiment is similar in construction to the first embodiment. The same reference numerals as used in FIG. 1 are used in FIG. 2 to identify the corresponding components. In the interest of brevity and simplification, repeated description of these components will not be provided.

Figure 3:
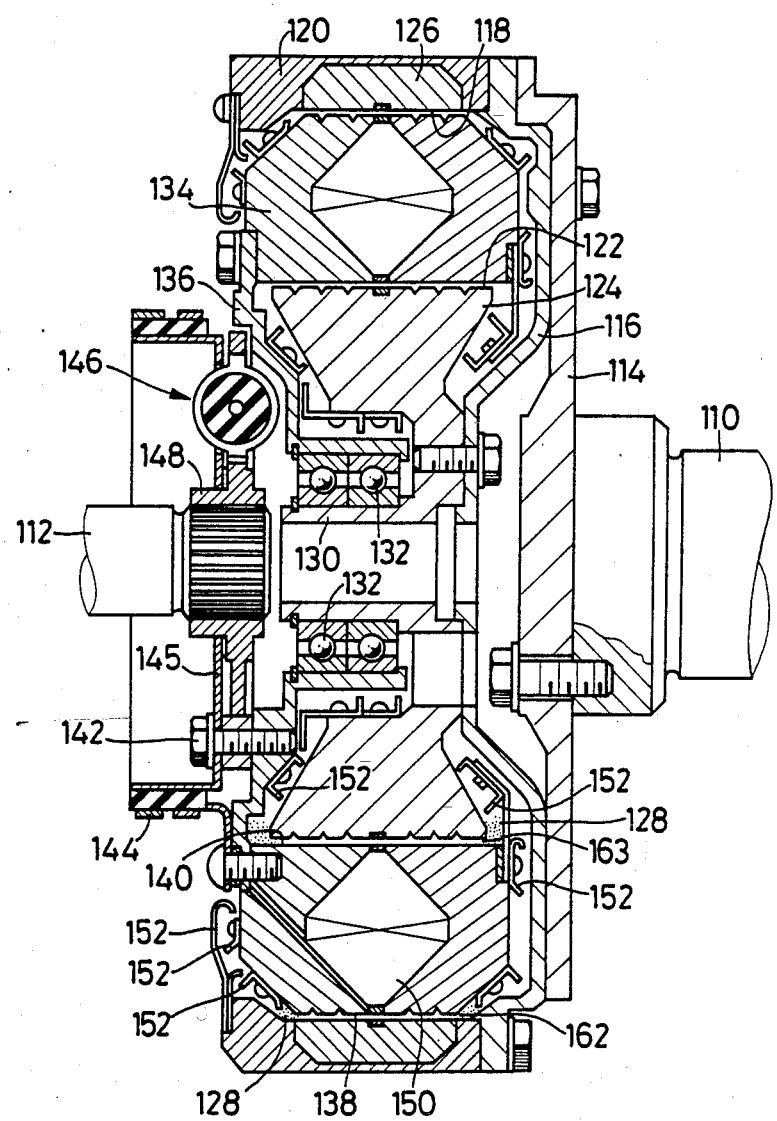
FIG. 3 is an elevational view in cross section showing a further embodiment of the invention.

Reference is now made to FIG. 3 illustrating an electromagnetic powder clutch for use in an automotive vehicle. The powder clutch is built in a clutch housing secured to an engine (not shown) of the vehicle. The clutch is used to selectively effect connection and disconnection between a crank shaft 110 as an input shaft and an output shaft 112. To one end of the crank shaft 110 is connected a disk-like first connecting member 114. To this first connecting member 114, there are fixed an outer or first driving member 120, and an inner or second driving member 124, via a second connecting member 116 of a non-magnetic material. The first member 120 is a cylindrical member of a non-magnetic material which has a radially inner friction surface 118 (first friction surface). The second driving member 124 is made of a magnetic material and has a radially outer friction surface 122. A magnetic member 126 made of a magnetic material is embedded in the first driving member 120, such that the inner surface is exposed so as to form a substantive part of the radially inner friction surface 118 (first friction surface) which contacts or engages a mass of magnetic powder 128. In the present embodiment, the first and second connecting members 114, 116, and the first (radially outer) and second (radially inner) driving members 120, 124, constitute a first or driving rotary member.

The second driving member 124 has a radially inner bearing portion 130 extending in its axial direction. Bearings 132, 132 are interposed between the bearing portion 130 and a radially inner portion of a positioning member 136 fixed to a yoke 134, so that the second driving member 124 and the positioning member 136 are rotatable relative to each other. In this arrangement, the yoke 134 as a second or driven rotary member, and the first or driving rotary member (first and second driving members 120, 124) are aligned with each other with a high accuracy of concentricity, so that the driven and driving members are rotatably supported. The yoke 134 is a thick-walled annular member made of a magnetic material which has a radially outer friction surface (first friction surface) 138 and a radially inner friction surface (second friction surface) 140. The outer friction surface 138 is opposite to the radially inner friction surface 118 of the first driving member 120 such that these surfaces 118 and 138 cooperate to define a first powder gap 162. In the meantime, the inner friction surface 140 is opposite to the radially outer friction surface 122 of the second driving member 124 such that these friction surfaces 140 and 122 cooperate to define a second powder gap 163. A member 145 carrying slip rings 144, 144 is fixed to the positioning member 136 with bolts 142. The positioning member 136 is connected via a damper 146 to a crank hub 148 which fits on the output shaft 112 by means of a spline. A solenoid coil 150 of a substantially rhombic cross sectional shape is embedded in the yoke 134. When a current is applied to the solenoid coil 150 through the slip rings 144, particles of the powder masses 128 are magnetized, and the first and second powder gaps 162 and 163 are filled with the powder masses 128 in the form of tightly coherent bodies. Thus, the first and second driving members 120, 124 are connected to the yoke 134 by means of the coherent powder masses 128 in the respective powder gaps 162, 163. As described in connection with the first embodiment, the powder masses 128 are enclosed in the powder gaps 162, 163 by various labyrinth members 152, which are attached to the first driving member 120, yoke 134, positioning member 136 and second driving member 124.

The yoke 134 is dimensioned so that an area S1 of the radially outer friction surface 138 (first outer friction surface) is substantially or almost equal to an area S2 of the radially outer friction surface 122 (second outer friction surface) of the second driving member 124. Described in greater detail, the areas S1 and S2 of the friction surfaces 138 and 122 are expressed by the following equations (1) and (2), respectively:

$$S1 = \pi \cdot D1 \cdot L1 \quad (1)$$

$$S2 = \pi \cdot D2 \cdot L2 \quad (2)$$

where,
L1: axial width of the surface 138
L2: axial width of the surface 122
D1: diameter of the surface 138
D2: diameter of the surface 122

Accordingly, the areas S1 and S2 of the friction surfaces 138 and 122 are determined so as to satisfy the following equation (3):

$$D1 \cdot L1 \approx D2 \cdot L2 \quad (3)$$

Figure 4:
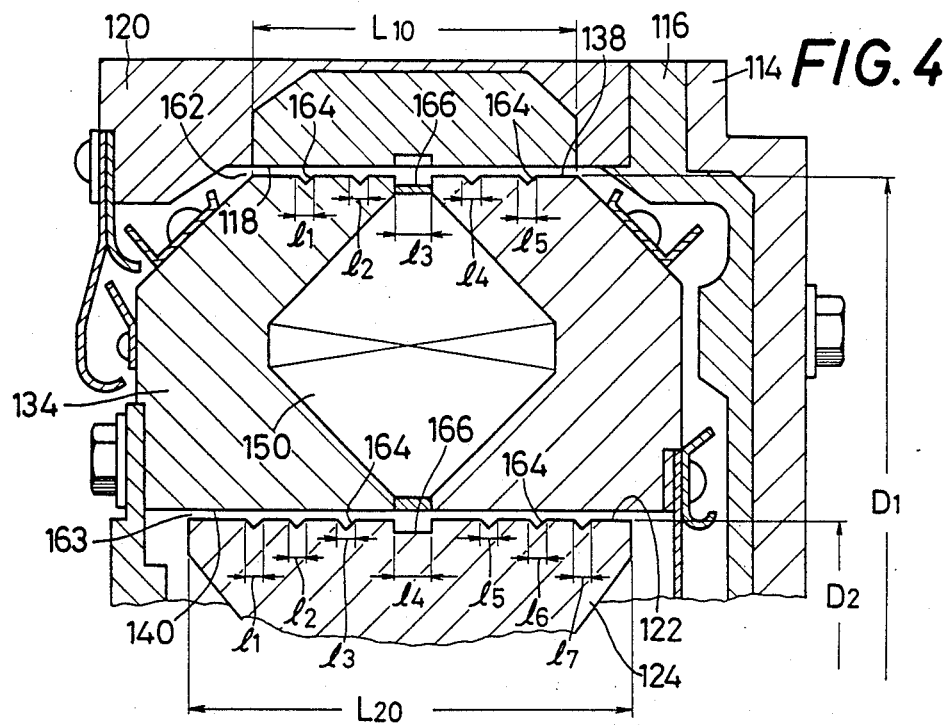
FIG. 4 is a fragmentary enlarged view showing a part of the powder clutch of FIG. 3.

As shown in FIG. 4, the radially outer friction surface 138 of the yoke 134 and the radially outer friction surface 122 of the second driving member 124 are formed with circumferential grooves 164 for improving the torque transmission characteristics of the clutch, and with central circumferential recesses 166 for separating magnetic paths of opposite directions. In this connection, it is noted that the axial widths L1 and L2 do not include widths of the grooves 164 and recesses 166. More specifically, a portion of the axial width L1 of the friction surface 138 that does not actually serve to provide a friction surface is expressed as $$\sum_{k=1}^{n} l_k,$$

and a portion of the axial width L2 of the friction surface 122 that does not actually serve to provide a friction surface is expressed as $$\sum_{k=1}^{n'} l_k',$$

where the widths of the grooves 164 and the recesses 166 are l1 through ln, respectively. Therefore, the substantive axial widths L1 and L2 of the friction surfaces 138, 122 are obtained from the following equations (4) and (5):

$$L1 = L_{10} - \sum_{k=1}^{n} l_k \quad (4)$$

$$L2 = L_{20} - \sum_{k=1}^{n'} l_k' \quad (5)$$

where,
$L_{10}$: nominal width of the surface 138 (in FIG. 4)
$L_{20}$: nominal width of the surface 122 (in FIG. 4)

Figure 5:
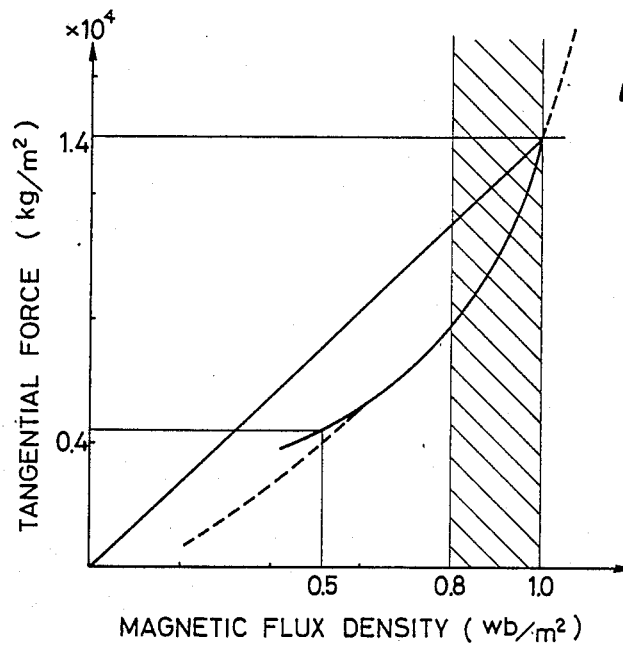
FIG. 5 is a graph indicating a relation between a magnetic flux density on a friction surface of the clutch and a tangential force per unit area of the friction surface.

In a conventional electromagnetic powder clutch of two-gap type, outer and inner friction surfaces corresponding to the friction surfaces 138, 122 have substantially the same axial width ($L1 = L2$). Suppose the diameters of these outer and inner friction surfaces are 1:2 ($D1 = 2 \cdot D2$), S1/S2 is equal to 2 ($S1/S2 = 2$). If, for example, a magnetic flux density B ($\Phi/S$) on the inner friction surface (122) is an upper limit 1.0 (wb/m$^2$) of a nominal range of FIG. 5, a magnetic flux density on the outer friction surface (138) is 0.5 (wb/m$^2$), where $\Phi$ is a magnetic flux (wb). In this instance, tangential forces f1 and f2 per unit area on the outer and inner friction surfaces (138, 122) are obtained from the relation of FIG. 5, as $f1 = 0.4 \times 10^4$ (kg/m$^2$), and $f2 = 1.4 \times 10^4$ (kg/m$^2$), respectively. Torques T1 and T2 transmitted by the outer and inner friction surfaces (138, 122) are expressed by the following equations (6) and (7):

$$T1 = (\pi/2) \cdot f1 \cdot D1^2 \cdot L1 \quad (6)$$

$$T2 = (\pi/2) \cdot f2 \cdot D2^2 \cdot L2 \quad (7)$$

From the above equations, a total torque T (T1+T2) transmitted by the clutch is obtained as follows:

$$\begin{aligned} T &= \pi \cdot L2 \cdot D2^2 (2f1 + \tfrac{1}{2} f2) \\ &= 1.5 \pi \cdot L2 \cdot D2^2 \times 10^4 \text{ (kg/m}^2\text{)} \end{aligned} \quad (8)$$

In the instant embodiment wherein $S1 \approx S2$, however, the axial width $L1 = \tfrac{1}{2} \cdot L2$ when $D1 = 2 \cdot D2$. Hence, torques T1 and T2 transmitted by the friction surfaces 138 and 122, and a total torque T of the clutch, are calculated according to the following equations (9), (10) and (11), respectively $$T1 = (\pi/2) \cdot f2 \cdot D1^2 \cdot \tfrac{1}{2} L2 \quad (9)$$

$$T2 = (\pi/2) \cdot f2 \cdot D2^2 \cdot L2 \quad (10)$$

$$T = \pi \cdot L2 \cdot D2^2 \, (f2 + \tfrac{1}{2} f2) \qquad (11)$$
$$= 2.1 \, \pi \cdot L2 \cdot D2^2 \times 10^4 \, (kg/m^2)$$

It will be understood from the equations (8) and (11) that the instant powder clutch has a torque transmission capability 1.4 times as large as the conventional powder clutch of the equation (8) wherein the axial width of the outer friction surface 138 is almost equal to that of the inner friction surface 122.

Next, a consideration is given to amounts of heat generated in the first and second powder gaps 162, 163.

An amount of heat E generated due to frictional slip of the clutch is obtained as:

$$E = T \cdot r \qquad (12)$$

where, r: number of revolutions due to slip

In the conventional powder clutch wherein the outer and inner friction surfaces 138, 122 have the same axial width, therefore, amounts of heat E1 and E2 generated on the outer friction surface 138 and the inner friction surface 122 are calculated according to the following equations (13) and (14), respectively:

$$E1 = (\pi/2) \cdot 0.4 \cdot 10^4 \cdot D1^2 \cdot L1 \cdot r \qquad (13)$$

$$E2 = (\pi/2) \cdot 0.35 \cdot 10^4 \cdot D1^2 \cdot L1 \cdot r \qquad (14)$$

In the instant embodiment of FIG. 4 wherein the axial width L1 is one half of the axial width L2, on the other hand, E1 to E2 is equal to 2 to 1 ($E1:E2=2:1$). That is, the amount of heat E1 generated on the outer friction surface 138 is about two times as large as the amount of heat E2 generated on the inner friction surface 122. In this connection, it is noted that the outer friction surface 138 undergoes a higher degree of heat dissipation than the inner friction surface 122. Therefore, the overall heat dissipation of the clutch is improved. Consequently, the maximum permissible amount of heat generated by the clutch is increased, and the durability of the clutch is accordingly improved.

While the present embodiment is adapted so that the areas S1 and S2 of the friction surfaces 138, 122 are substantially or almost equal to each other, the principle of the invention may be practiced, provided a difference of the area S1 from the area S2 is held within a range of $\pm 30\%$, i.e., $S1 = 0.7 \sim 1.3 \cdot S2$. In other words, the amounts of heat to be generated on the friction surfaces 138, 122 may be suitably selected with respect to each other so as to improve the torque transmission capability or characteristics of the powder clutch by determining the areas S1 and S2 in the above-specified range.

Although the first and second connecting members 114, 116, and the first and second driving members 120, 124 constitute a driving rotary member of the clutch, it is possible that these elements are used to constitute a driven rotary member which is driven by a driving member in the form of the yoke 134.

Figure 6:
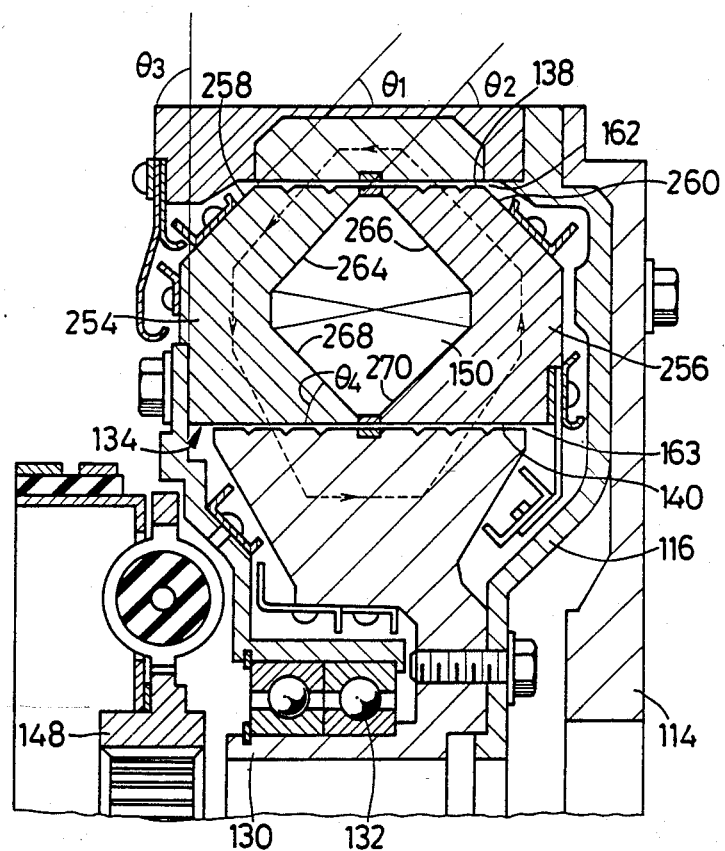
FIG. 6 is a fragmentary enlarged view showing yet a further embodiment of the invention.

Referring to FIG. 6, a further embodiment of the invention will be described. In FIG. 6, the same reference numerals as used in FIGS. 3-4 are used to identify the corresponding components. These components will not be described in the interest of brevity.

The annular solenoid coil 150 embedded in the yoke 134 has a substantially rhombic cross sectional shape, and is disposed such that a pair of corners on a diagonal of the rhombus perpendicular to the axis of rotation of the clutch are located adacent to the radially outer and inner friction surfaces 138 and 140 of the yoke 134, respectively. Accordingly, the yoke 134 consists of two halves, i.e., a first half 254 and a second half 256 which cooperate to enclose or surround the rhombic shape of the solenoid coil 150 in cross section taken in a plane including the axis of the yoke 134. The first and second halves 254 and 256 of the yoke 134 are dimensioned and shaped such that their wall thickness in the above cross section (FIG. 6) is reduced as the halves 254, 256 extend in the radially outward direction, so that the magnetic flux density is almost constant irrespective of the radial position of the first and second halves 254, 256 of the yoke 134. Described in more detail, the yoke 134 has a pair of symmetrically inclined outer surfaces 258 and 260 which terminate in the opposite ends of the radially outer friction surface 138, as viewed in FIG. 6. The yoke 134 further has a pair of symmetrically inclined inner surfaces 264 and 266 which contact radially outer two sides of the rhombus of the solenoid coil 150 and which correspond to the inclined outer surfaces 258 and 260, respectively. The yoke 134 has another pair of symmetrically inclined inner surfaces 268 and 270 which contact radially inner two sides of the rhombus of the coil 150. An angle $\theta 1$ of inclination of the inclined outer surfaces 258, 260 with respect to the axis of the clutch is selected to be smaller than an angle $\theta 2$ of inclination of the inclined inner surfaces 264, 266, i.e., $\theta 2 > \theta 1$. Furthermore, an angle $\theta 4$ of inclination of the inclined inner surfaces 268, 270 with respect to the axis of the clutch is determined to be smaller than an angle $\theta 3$ of inclination of an axial end surface of the yoke 134 with respect to the axis of the clutch, i.e., $\theta 3 > \theta 4$. This arrangement assures a substantially constant magnetic flux density over the entire cross sectional area of the first and second halves 254, 256 of the yoke 134 through which magnetic paths pass in opposite directions as indicated in broken line in FIG. 6. That is, the magnetic flux density in the yoke 134 is constant irrespective of the radial position.

In general, a torque T transmitted by an electromagnetic powder clutch is expressed by the following equation (15):

$$T = f \cdot (\pi/2) \cdot D^2 \cdot L \, (kg/m^2) \qquad (15)$$

where,
D: diameter of friction surface
L: a axial width of friction surface
f: tangential force per unit area of friction surface ($kg/m^2$)

The tangential force f is obtained from the following equation (16):

$$f = Ko \, \mu_f B^2 \, (kg/m^2) \qquad (16)$$

where,
Ko: constant determined by a density, magnetic characteristics of magnetic powder, etc.
$\mu_f$: coefficient of friction of magnetic powder
B: magnetic flux density ($wb/m^2$) of friction surface Therefore, if the size of the clutch and the kind of mangetic powder used in the clutch are determined, the torque transmitted by the clutch may be determined based on the magnetic flux density B. The magnetic flux density B is obtained from the following equation (17):

$$B = \Phi/S \qquad (17)$$

where,
$\Phi$: magnetic flux (wb),
S: cross sectional area of magnetic paths ($m^2$)

Figure 7:
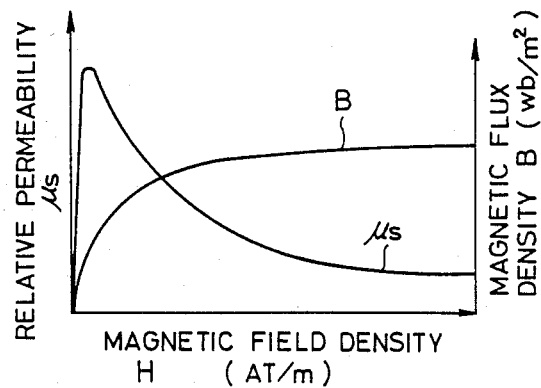
FIG. 7 is a graph showing changes of a relative magnetic permeability and a magnetic flux density in relation to an intensity of magnetic field.
Figure 8:
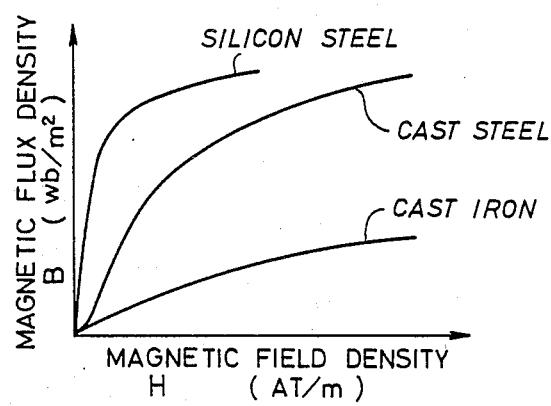
FIG. 8 is a graph showing relations between an intensity of magnetic field and a magnetic flux density of ferrous materials.

The equation (18) is converted into the following equation (18):

$$B = \mu \cdot (n \cdot I)/l \quad (\text{wb/m}^2) \quad (18)$$

where,
- $\mu$: magnetic permeability
- n: number of windings of coil
- I: energization current
- l: length of magnetic circuit Suppose the coil winding number n and the length l of the magnetic circuit are constant, the magnetic permeability $\mu$ or relative permeability $\mu_s$ is changed with a magnitude of the energization current I, as indicated in FIG. 7. Magnetic materials such as cast iron, cast steel and silicon steel are magnetically saturated as shown in FIG. 8. For example, carbon steel S10C (for machine structural use) according to Japanese Industrial Standard is magnetically saturated in the neighborhood of 1.6 wb/m². If the yoke 134 is magnetically saturated locally at a given portion, the transmission torque will not be increased by increasing the energization current I even when the other portion of the yoke 134 is magnetically unsaturated. That is, the maximum transmission torque is obtained when the yoke 134 is magnetically saturated at any local portion, and this saturated local portion is a bottleneck limiting the transmission torque of the clutch. FIG. 8 shows in cross section a typical conventional electromagnetic powder clutch of single-gap type, the construction of which is also applicable to a powder clutch of two- or double-gap type. In this conventional construction, portions A of a yoke 272 are highest in magnetic flux density, while portions B of the yoke 272 are lowest in magnetic flux density. Assuming the diameters at the portions A and B are $D_A$ and $D_B$, respectively, the circumferential areas $S_A$ and $S_B$ of the portions A and B (at their diameters $D_A$ and $D_B$) are obtained from the following equations (19) and (20), respectively:

$$S_A = \pi D_A \cdot L1 \quad (19)$$

$$S_B = \pi D_B \cdot L1 \quad (20)$$

where, L1: width of magnetic path (FIG. 9)

For example, where $D_A$ is 148 mm and $D_B$ is 191 mm, $S_A:S_B = 148:191 \approx 1:1.29$. As a ratio of magnetic flux densities at the portions A and B is a reciprocal of a ratio of their cross sectional areas, $B_A:B_B = 1:0.775 \approx 1.3:1$. That is, when the portions A are magnetically saturated, the portions B are 30% unsaturated, namely, the magnetic flux density at the portions B is 30% less than that at the portions A.

A moment of inertia R is expressed by the following equation (21):

$$R = (\pi/32) \cdot \delta \cdot Lw \cdot D^4 \quad (21)$$

where,
- $\delta$: density of yoke 272
- Lw: axial width of yoke 272
- D: diameter of yoke 272

For comparing a moment of inertia R in the conventional arrangement of FIG. 9 with a moment of inertia Rk corresponding to that of the present embodiment of FIG. 6, portions C of the yoke 272 corresponding to the 30% surplus of the portions B are removed. The moment of inertia R before removal of the portions C, and the moment of inertia Rk after removal of the portions C are obtained from the following equations (22) and (23), where $D_A$ is 148 mm and $D_B$ is 191 mm:

$$R = \frac{\pi}{32} \cdot \delta \cdot L1 \, (D_B^4 - D_A^4) \quad (22)$$

$$Rk = \frac{\pi}{32} \cdot \delta \cdot L1 \left[ D_B^4 - \left(\frac{D_B + D_A}{2}\right)^4 \right] \times 0.7 + \frac{\pi}{32} \cdot \delta \cdot L1 \left[ \left(\frac{D_B + D_A}{2}\right)^4 - D_A^4 \right] \quad (23)$$

Thus, $R:Rk \approx 1.22:1$. Therefore, the moment of inertia Rk is reduced by more than 20%, as compared with the moment of inertia R.

While the above explanation is based on the powder clutch of FIG. 9 of single-gap type, it is appplicable to the powder clutch of FIG. 6 of double-gap type having the yoke 134. That is, the yoke 134 does not have an excessive weight at its radially outer portion or does not suffer an unnecessary increase in its moment of inertia, because the wall thickness of the first and second halves 254, 256 of the yoke 134 constituting a magnetic circuit is gradually reduced in the radially outward direction, as previously described.

As is apparent from the foregoing description, the powder clutch of FIG. 6 has a substantially constant cross sectional area of the magnetic flux paths in the yoke 134, in its radial direction, whereby the magnetic flux density is substantially constant at any positions of the yoke 134 in its radial direction. Accordingly, the weight and moment of inertia of the yoke 134 are minimized without reducing the maximum transmission torque of the clutch. When this electromagnetic powder clutch is used for an automotive vehicle, therefore, the fuel economy of the vehicle is increased owing to the reduced weight of the clutch, and the operating response of the clutch is improved thanks to the reduced moment of inertia of the yoke.

Although the solenoid coil 150 has a rhombic shape in cross section and the yoke 134 has an irregular hexagonal cross sectional shape, various changes and modifications may be made in the shape of the coil and yoke, including the provision of various suitable chambers or rounds at corners of the coil and yoke in cross section, as needed.

While the present invention has been described in its preferred embodiments with a certain degree of particularity, it is to be understood that the invention is not confined to the precise disclosure contained herein, but may be otherwise embodied, with various changes, modifications and improvements which may occur in those skilled in the art, without departing from the spirit and scope of the invention defined in the appended claims.

What is claimed is:

1. An electromagnetic powder clutch of double-gap type comprising:
    an annular driven rotary member incorporating therein a solenoid coil and having a portion which is made of a magnetic material and which surrounds said solenoid coil;
    a connecting member made of a non-magnetic material;

first and second driving rotary members disposed radially outwardly and inwardly of said annular driven rotary member, respectively, and connected to each other by said connecting member, said first driving rotary member and said driven rotary member cooperating to define a first powder gap therebetween, and said second driving rotary member and said driven rotary member cooperating to define a second powder gap therebetween, said first and second powder gaps accommodating therein first and second masses of magnetic powder, respectively, said first and second driving rotary members including radially inner and radially outer portions made of a magnetic material, respectively, said radially inner and outer portions of the first and second driving rotary members being opposite to radially outer and inner surfaces of said driven rotary member, respectively; and a labyrinth device disposed to separate said first and second annular powder gaps from each other.

2. An electromagnetic powder clutch according to claim 1, wherein said radially outer surface of said annular driven rotary nmember has an area which is 70–130% of an area of an outer surface of said radially outer portion of said second driving rotary member.

3. An electromagnetic powder clutch according to claim 2, wherein said radially outer surface of the annular driven rotary member has substantially the same area as said outer surface of the radially outer portion of said second driving rotary member.

4. An electromagnetic powder clutch according to claim 1, wherein said annular driven rotary member comprises two halves which surround said solenoid coil in cross section taken in a plane including an axis of the annular driven rotary member, a wall thickness of said two halves as measured along said axis being reduced as the two halves extend in a radially outward direction in said cross sectional plane.

5. An electromagnetic powder clutch of double-gap type comprising:

a first rotary member having first and second friction surfaces, the second friction surface being disposed radially inwardly of and opposite to said first friction surface;

a second rotary member of an annular shape incorporating therein an annular solenoid coil and having a wall thickness sufficient to accomodate said solenoid coil, said second rotary member being disposed between said first and second friction surfaces of said first rotary member, and having a radially outer friction surface opposite to said first friction surface and a radially inner friction surface opposite to said second friction surface, said radially outer friction surface of the second rotary member cooperating with said first friction surface to define therebetween a first powder gap accommodating therein a first mass of magnetic powder, and said radially inner friction surface of the second rotary member cooperating wih said second friction surface to define therebetween a second powder gap accommodating therein a second mass of magnetic powder; and a labyrinth device for closing said first and second powder gaps to enclose said first and second masses of magnetic powder in the first and second powder gaps, respectively.

* * * * *